US007996875B2

(12) United States Patent
Guo et al.

(10) Patent No.: US 7,996,875 B2
(45) Date of Patent: Aug. 9, 2011

(54) ADAPTIVE TIMESHIFT SERVICE

(75) Inventors: Terry Q Guo, Mountain View, CA (US); Hui Wan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 12/124,134

(22) Filed: May 20, 2008

(65) Prior Publication Data

US 2009/0293092 A1 Nov. 26, 2009

(51) Int. Cl.
    *H04N 7/173* (2011.01)
(52) U.S. Cl. .......... 725/94; 711/133; 711/134; 711/143; 725/143; 709/226
(58) Field of Classification Search ....................... 725/94
    See application file for complete search history.

(56) References Cited

U.S. PATENT DOCUMENTS

| | | | | |
|---|---|---|---|---|
| 5,381,528 A * | 1/1995 | Brunelle | ........................ | 710/56 |
| 5,414,455 A * | 5/1995 | Hooper et al. | .................. | 725/88 |
| 5,675,383 A * | 10/1997 | Yagasaki et al. | ........... | 348/390.1 |
| 6,009,231 A * | 12/1999 | Aoki et al. | ..................... | 386/353 |
| 6,304,924 B1 * | 10/2001 | Varma | .............................. | 710/52 |
| 6,434,748 B1 * | 8/2002 | Shen et al. | ...................... | 725/89 |
| 6,744,967 B2 | 6/2004 | Kaminski et al. | | |
| 6,792,449 B2 | 9/2004 | Colville et al. | | |
| 6,816,905 B1 | 11/2004 | Sheets et al. | | |
| 7,149,868 B2 | 12/2006 | Parry et al. | | |
| 7,167,639 B2 * | 1/2007 | Haddad et al. | ................ | 386/241 |
| 7,206,509 B2 | 4/2007 | Beacken | | |
| 7,263,280 B2 * | 8/2007 | Bullock et al. | ................ | 386/241 |
| 7,734,153 B1 * | 6/2010 | Park | .............................. | 386/241 |
| 2002/0112247 A1 * | 8/2002 | Horner et al. | .................. | 725/112 |
| 2003/0005074 A1 * | 1/2003 | Herz et al. | ..................... | 709/216 |
| 2003/0093803 A1 * | 5/2003 | Ishikawa et al. | ............... | 725/94 |
| 2003/0208612 A1 * | 11/2003 | Harris et al. | .................... | 709/231 |
| 2003/0228140 A1 * | 12/2003 | Bullock et al. | ................ | 386/125 |
| 2004/0081153 A1 * | 4/2004 | Mayer et al. | .................... | 370/392 |
| 2004/0197078 A1 * | 10/2004 | Yoon et al. | ...................... | 386/46 |
| 2004/0202073 A1 * | 10/2004 | Lai et al. | ...................... | 369/47.33 |
| 2005/0078781 A1 * | 4/2005 | Charpentier | .................. | 375/372 |
| 2005/0146990 A1 * | 7/2005 | Mayer | ............................ | 368/95 |
| 2005/0183120 A1 | 8/2005 | Jain et al. | | |
| 2006/0171658 A1 * | 8/2006 | Jochemsen et al. | ............ | 386/46 |
| 2006/0195633 A1 * | 8/2006 | Plourde, Jr. | ..................... | 710/52 |
| 2007/0101377 A1 * | 5/2007 | Six et al. | ......................... | 725/86 |
| 2007/0107026 A1 | 5/2007 | Sherer et al. | | |
| 2007/0136679 A1 * | 6/2007 | Yang | ............................. | 715/772 |
| 2007/0226767 A1 | 9/2007 | Kaminski et al. | | |

(Continued)

OTHER PUBLICATIONS

Ku, "NVIDIA's ForceWare Multimedia—An In-House Production", Jul. 11, 2004, AnandTech, pp. 32.

(Continued)

*Primary Examiner* — Scott Beliveau
*Assistant Examiner* — Mark P Stanley (57) ABSTRACT

An adaptive timeshift service is described. In embodiment(s), television content can be distributed from a live content server to television client devices, and the television content that is distributed from the live content server can be recorded at a timeshift server. Recorded television content can then be distributed from the timeshift server when requested by a television client device. An additional timeshift server can be allocated, and both the television content from the live content server and the recorded television content from the timeshift server can be written to a buffer of the additional timeshift server.

16 Claims, 5 Drawing Sheets

U.S. PATENT DOCUMENTS

| | | | |
|---|---|---|---|
| 2007/0234395 A1 | 10/2007 | Dureau et al. | |
| 2007/0263980 A1* | 11/2007 | Chen et al. | 386/68 |
| 2008/0089671 A1* | 4/2008 | Lang et al. | 386/109 |
| 2008/0163303 A1* | 7/2008 | Chou et al. | 725/46 |
| 2009/0204755 A1* | 8/2009 | Rushworth et al. | 711/110 |
| 2010/0175088 A1* | 7/2010 | Loebig et al. | 725/40 |

OTHER PUBLICATIONS

Guo, et al., "Scalable Live Video Streaming to Cooperative Clients Using Time Shifting and Video Patching", In Proceedings of the Twenty-third AnnualJoint Conference of the IEEE Computer and Communications Societies in INFOCOM 2004, vol. 3, pp. 11.

* cited by examiner

ADAPTIVE TIMESHIFT SERVICE

BACKGROUND

Scheduled television programming can be recorded when initially distributed for viewing as a live broadcast, and can then be made available for on-demand viewing when requested via a media device, such as a television set-top box. This is commonly referred to as Network Digital Video Recording (nDVR) and a viewer can request the recorded television content, such as movies and television programs, when convenient for the viewer. In a television content distribution system, a live content server can distribute the television content to broadcast it for viewing, and a timeshift server can record the television content as it is being distributed.

Depending on the viewing demands and requests for recorded television content, new timeshift servers can be allocated as needed to meet the requests and viewing demands. When a new timeshift server is allocated, the television content is buffered as it is being broadcast for live viewing, and a buffer of the timeshift server has to be completely written with the broadcast television content before the timeshift server can be placed on-line to service the requests and viewing demands. A newly allocated timeshift server that provides a recording of the last seven days of recorded television content, for example, will not be available to service the increasing viewing demands for the seven days needed to write the buffer of the newly allocated timeshift server with the live television content as it is being distributed.

SUMMARY

This summary is provided to introduce simplified concepts of an adaptive timeshift service. The simplified concepts are further described below in the Detailed Description. This summary is not intended to identify essential features of the claimed subject matter, nor is it intended for use in determining the scope of the claimed subject matter.

An adaptive timeshift service is described. In embodiment(s), television content can be distributed from a live content server to television client devices and/or to other media devices. The television content that is distributed from the live content server can be recorded at a timeshift server, and recorded television content can then be distributed from the timeshift server when requested by a television client device. An additional timeshift server can be allocated, such as to accommodate multiple requests for the recorded television content, and both the television content from the live content server and the recorded television content from the timeshift server can be written to a buffer of the additional timeshift server.

In other embodiment(s), the television content from the live content server can be written to the buffer of the additional timeshift server along with recorded television content from multiple timeshift servers. The buffer of the additional timeshift server has a timeshift duration that designates a duration of recorded television content and how far back in time a viewer can request recorded television content. The television content from the live content server can be written forward in the timeshift duration and the recorded television content from the timeshift server can be written backward in the timeshift duration until the buffer is filled to encompass the timeshift duration. When the buffer is filled, only the television content from the live content server can then be written forward in the buffer to write over the recorded television content that is earliest in the timeshift duration.

BRIEF DESCRIPTION OF THE DRAWINGS

Embodiments of an adaptive timeshift service are described with reference to the following drawings. The same numbers are used throughout the drawings to reference like features and components.

DETAILED DESCRIPTION

Embodiments of an adaptive timeshift service provide that when a new timeshift server is allocated, a buffer of the allocated timeshift server is written with both live television content from a live content server and with recorded television content from one or more other timeshift servers so that the allocated timeshift server can be quickly made available to service requests for recorded television content from television client devices. Writing the television content to the buffer of a newly allocated timeshift server from at least two different sources is much faster than waiting for the buffer to be filled with only live television content as it is being distributed for live viewing.

While features and concepts of the described systems and methods for an adaptive timeshift service can be implemented in any number of different environments, systems, and/or various configurations, embodiments of an adaptive timeshift service are described in the context of the following example systems and environments.

Figure 1:
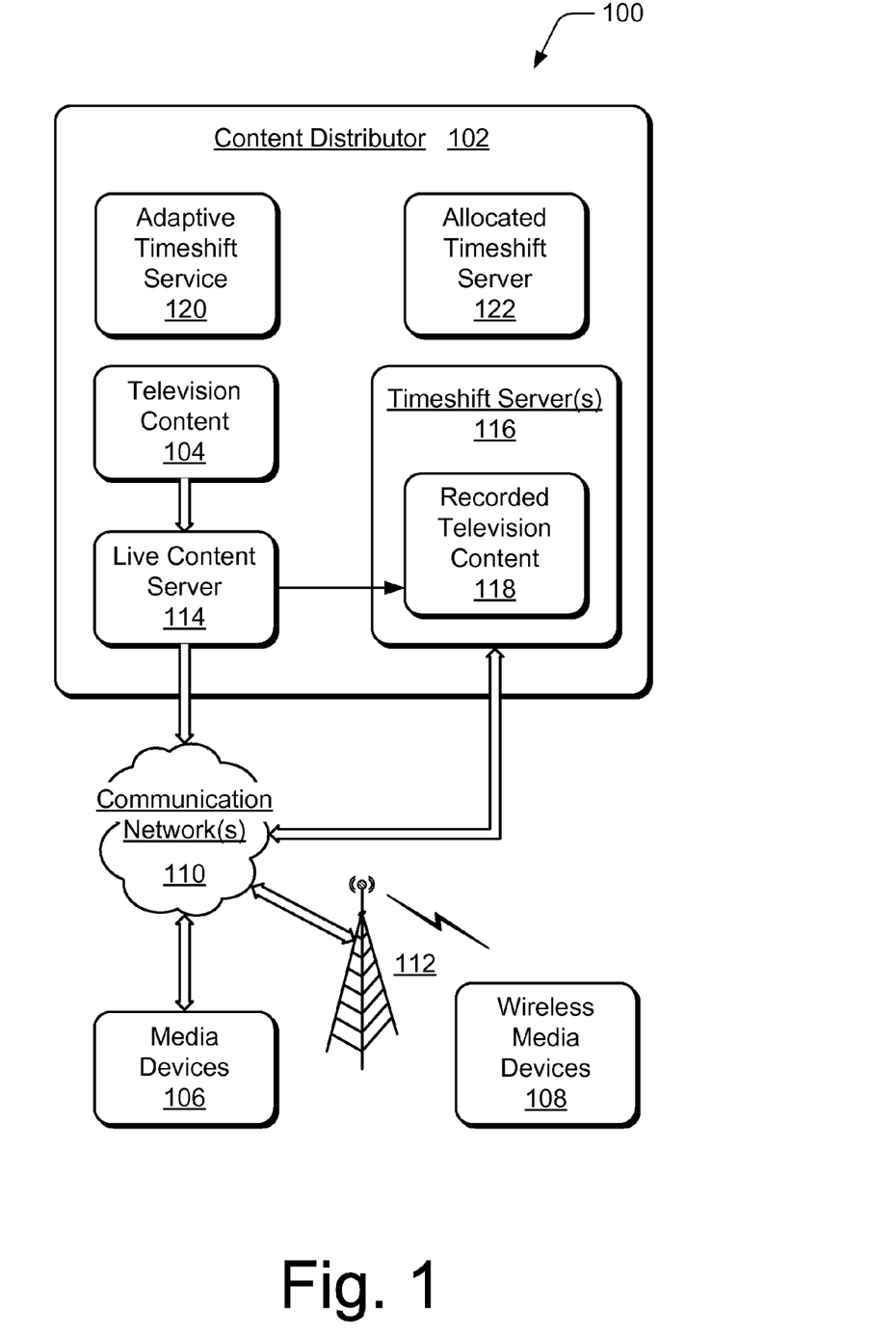
FIG. 1 illustrates an example system in which embodiments of an adaptive timeshift service can be implemented.

FIG. 1 illustrates an example system 100 in which various embodiments of an adaptive timeshift service can be implemented. In this example, system 100 includes a content distributor 102 that communicates or otherwise distributes television content 104 to any number of various media devices 106 and/or wireless media devices 108 via communication network(s) 110. The various media devices 106 and wireless media devices 108 can include television client devices (e.g., wired and/or wireless client devices) that receive the television content 104 in a television content distribution system.

Communication network(s) 110 can be implemented to include any type of a data network, voice network, broadcast network, an IP-based network, and/or a wireless network 112 that facilitates content distribution and data communication between the content distributor 102, media devices 106, and wireless media devices 108. The communication network(s) 110 can be implemented using any type of network topology and/or communication protocol, and can be represented or otherwise implemented as a combination of two or more networks. Any one or more of the arrowed communication links facilitate two-way data communication, such as from the content distributor 102 to a media device 106 and vice-versa.

The content distributor 102 can include media content servers that are implemented to communicate or otherwise distribute media content, recorded on-demand assets, and/or other data to any number of the various media devices 106 and wireless media devices 108. In the example system 100, content distributor 102 includes a live content server 114 that distributes the television content 104 to the media devices 106 and/or to the wireless media devices 108 via the communication network(s) 110.

The content distributor 102 also includes one or more timeshift servers 116 that record the television content 104 as it is being distributed by the live content server 114. A timeshift server 116 can then distribute recorded television content 118 when requested by a television client device (e.g., a media device 106). The recorded television content 118 is an example of a Network Digital Video Recording (nDVR) that can be requested as a movie or recorded television program when convenient for a viewer to watch the recorded movie or program.

In an implementation, a television client device (e.g., media device 106) can receive a multicast of live television content 104 from the live content server 114, and then communicate an instruction to the content distributor 102 to begin rewinding the television content, such as when initiated by a viewer at the television client device. The content feed from the content distributor 102 then switches from the live content server 114 to a timeshift server 116 that provides the recorded television content 118 to rewind, or go back to earlier television content that has been recorded.

The television content 104 (to include the recorded television content 118) can include any type of audio, video, and/or image media content received from any type of media content source. As described throughout, "media content" or "television content" (to include recorded media content and recorded television content) can include television programs (or programming), advertisements, commercials, music, movies, and on-demand media content or assets. A timeshift server 116 can include storage media to store or otherwise maintain various data and media content, such as the recorded television content 118. The storage media can be implemented as any type of memory, random access memory (RAM), read only memory (ROM), any type of magnetic or optical disk storage, and/or other suitable electronic data storage. In addition, a content distributor 102 can be implemented with any number and combination of differing components as further described with reference to the example device shown in FIG. 4.

The content distributor 102 also includes an adaptive timeshift service 120 that can be implemented to monitor and control the timeshift servers 116, and allocate additional timeshift servers, such as the allocated timeshift server 122. The adaptive timeshift service 120 can allocate an additional timeshift server to accommodate multiple requests for the recorded television content. The adaptive timeshift service 120 can be implemented as computer-executable instructions and executed by processor(s) to implement the various embodiments and/or features described herein.

A television channel of the television content 104, such as a news channel or a sports channel, can be "hosted" as a "timeshift service" or "timeshift channel" on one or more of the timeshift servers 116 when the television channel is recorded as it is being distributed by the live content server 114. A viewer at a media device 106 can then initiate a request for the recording of the sports channel (e.g., the recorded television content 118 at a timeshift server 116), and the recorded television content 118 is distributed to the media device 106 that renders the program for viewing. As more viewers request the same recorded television content 118 from the timeshift servers 116, the capacity of a timeshift server to deliver the recorded programming is reached, and additional timeshift servers need to be allocated to host the service (e.g., the allocated timeshift server 122).

A minimal service deploy count is an operator configurable setting at the content distributor 102 that indicates a minimum number of timeshift servers 116 needed to host each timeshift channel. For example, if the minimal deploy count is two, then every timeshift channel is hosted on at least two different timeshift servers 116. Some timeshift channels may be recorded on more than two timeshift servers due to adaptive allocation. For example, when the capacity of a particular timeshift server 116 comes close to a capacity threshold, the most popular service (e.g., timeshift channel) on the server is allocated to another timeshift server, and a buffer of the allocated timeshift server 122 is filled with recorded television content.

A timeshift channel can be recorded at multiple timeshift servers 116, and multiple timeshift servers can each record any number of different television channels (e.g., the recorded television content 118). A television channel or service can be recorded for any number of hours and/or days at a timeshift server 116, and the timeshift duration of a buffer for recording at a timeshift server 116 can be operator configurable at the content distributor 102.

Although illustrated as described as a component or module of the content distributor 102, the adaptive timeshift service 120, as well as other functionality described to implement embodiments of an adaptive timeshift service, can be provided as a service apart from the content distributor 102 (e.g., on a separate server or by a third party service). Further, although the adaptive timeshift service 120 is illustrated and described as a single component or module, the adaptive timeshift service 120 can be implemented as several component applications or modules distributed to implement various embodiments of adaptive an timeshift service as described herein.

Figure 2:
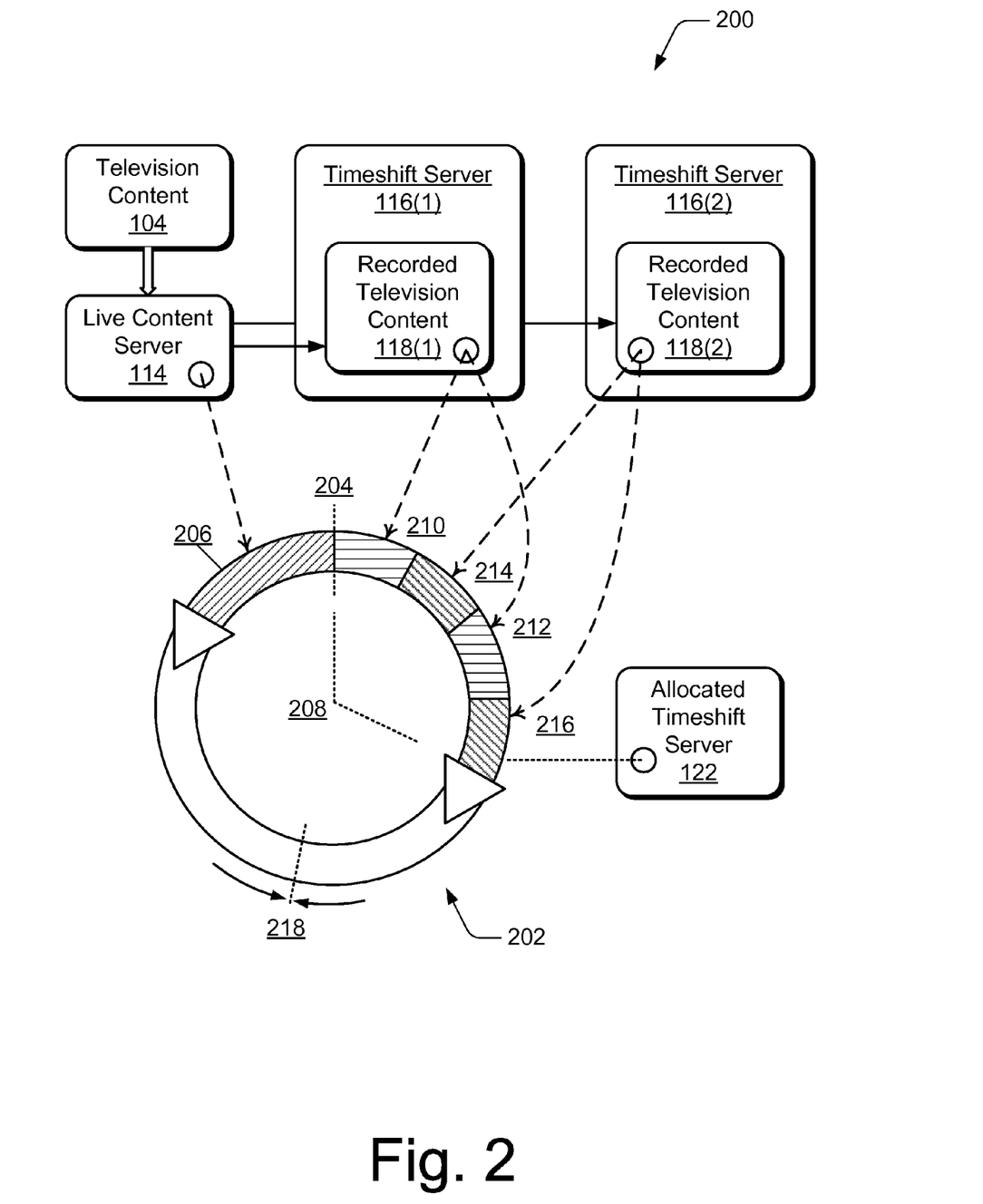
FIG. 2 illustrates another example system in which embodiments of an adaptive timeshift service can be implemented.

FIG. 2 illustrates an example system 200 in which various embodiments of an adaptive timeshift service can be implemented. In this example, system 200 includes the live content server 114 that distributes the television content 104, the allocated timeshift server 122, and timeshift servers 116(1) and 116(2) that include respective recorded television content 118(1) and 118(2) as described with reference to FIG. 1. The allocated timeshift server 122 includes a buffer 202 as storage media that can be implemented as a ring buffer to record the television content 104 as it is being distributed by the live content server 114.

When the new allocated timeshift server 122 is allocated by the adaptive timeshift service 120, the buffer 202 is written with both live television content 104 and recorded television content 118 so that the allocated timeshift server 122 can be quickly made available to service requests for recorded television content from television client devices. A television channel of the live television content 104 can be recorded at the allocated timeshift server 122 for any number of hours and/or days which is the timeshift duration of the buffer 202. For example, the allocated timeshift server 122 can provide a recording of the last seven days of recorded television content, and a viewer at a television client device can "rewind" to view any television programming from the last seven days (or longer as implemented).

In one or more embodiments, the adaptive timeshift service 120 coordinates writing both the television content 104 from the live content server 114 and the recorded television content 118 from a timeshift server 116 to the buffer 202 of the allocated timeshift server 122. For example, when the timeshift server 122 is newly allocated at a particular allocation time 204 (e.g., a "now" indication), the television content 104 from the live content server 114 is written forward in the timeshift duration of the buffer 202. As illustrated, a section 206 of the buffer 202 is written forward from the allocation time 204 with the live television content 104. Further, when the timeshift server 122 is newly allocated, the recorded television content 118 from one or more of the timeshift servers 116 is written backward in the timeshift duration of the buffer 202. As illustrated, a section 208 of the buffer 202 is written backward from the allocation time 204 with the recorded television content 118.

In an embodiment, section 208 of the buffer 202 can be written backward from the allocation time 204 with recorded television content 118 from multiple timeshift servers 116. For example, timeshift server 116(1) writes recorded television content 118(1) to segments 210 and 212 of section 208 of the buffer 202. Similarly, timeshift server 116(2) writes recorded television content 118(2) to segments 214 and 216 of the section 208 of the buffer 202. In various implementations, the recorded television content 118 can be copied from multiple timeshift servers to another timeshift server in a configuration of a peer-to-peer network, and the recorded television content 118 can be copied and recorded at a data packet level.

The television content 104 from the live content server 114 can be written forward in the buffer 202, and the recorded television content 118 from the timeshift servers 116 can be written backward in the buffer 202, until the buffer is filled to encompass the timeshift duration at a particular point 218 (e.g., a "buffer full" indication). Once the buffer 202 has been filled, then only the television content 104 from the live content server 114 need be written forward in the buffer 202 to write over the recorded television content that is earliest in the timeshift duration (e.g., the oldest television content that has been recorded in the buffer of the allocated timeshift server 122).

Example method 300 is described with reference to FIG. 3 in accordance with one or more embodiments of an adaptive timeshift service. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions which can include software, applications, routines, programs, objects, functions, methods, procedures, components, modules, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
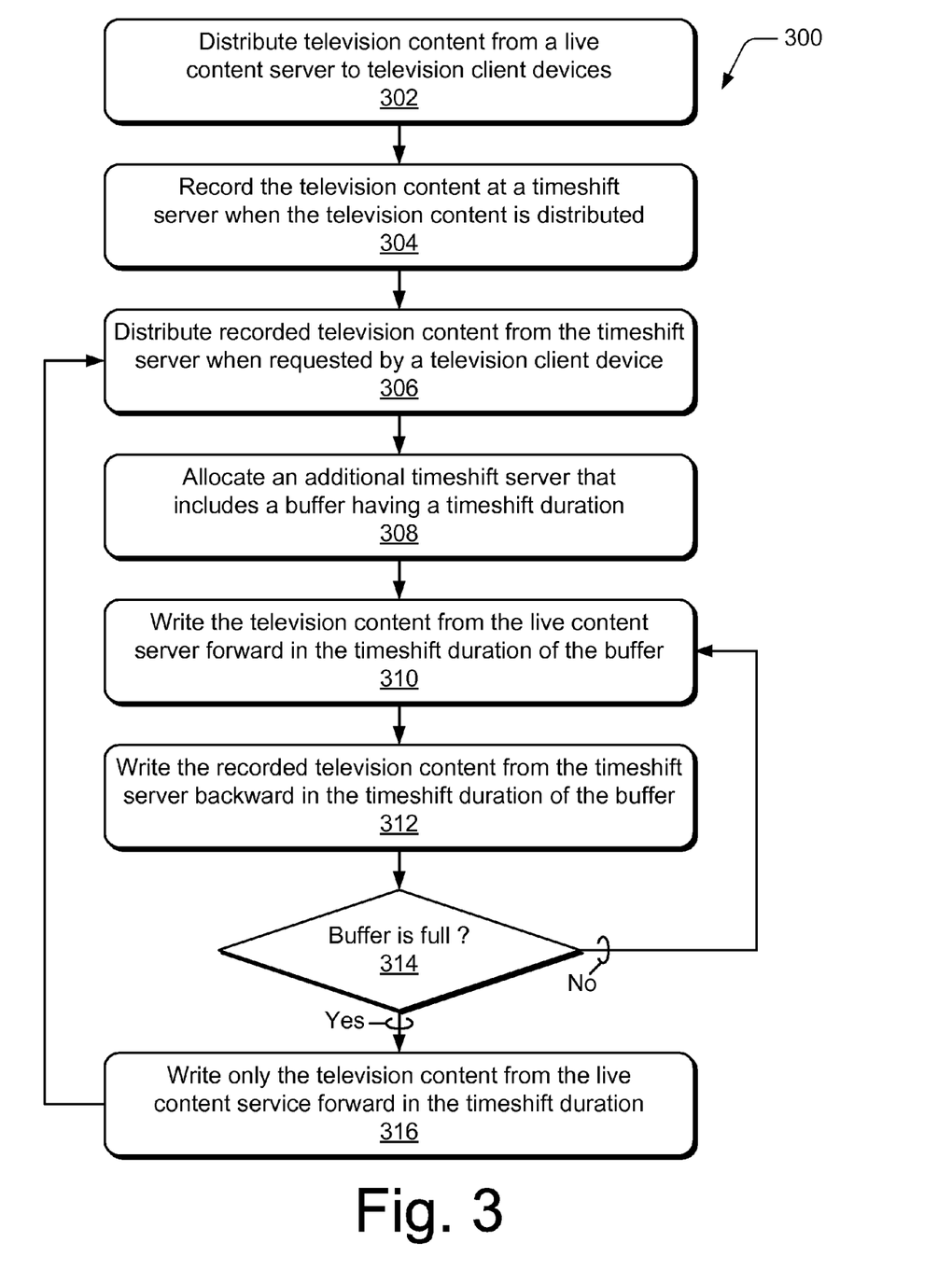
FIG. 3 illustrates example method(s) for an adaptive timeshift service in accordance with one or more embodiments.

FIG. 3 illustrates example method(s) 300 of an adaptive timeshift service. The order in which the method is described is not intended to be construed as a limitation, and any number of the described method blocks can be combined in any order to implement the method, or an alternate method.

At block 302, television content is distributed from a live content server to television client devices. For example, the live content server 114 at content distributor 102 (FIG. 1) distributes television content 104 to the media devices 106 and/or to the wireless media devices 108 via the communication network(s) 110.

At block 304, the television content is recorded at a timeshift server when the television content is distributed from the live content server. For example, the timeshift servers 116 at content distributor 102 record the television content 104 as it is being distributed by the live content server 114. At block 306, recorded television content is distributed from the timeshift server when requested by a television client device. For example, a timeshift server 116 at content distributor 102 distributes the recorded television content 118 when requested by a television client device (e.g., a media device 106).

At block 308, an additional timeshift server is allocated that includes a buffer having a timeshift duration. For example, the allocated timeshift server 122 is allocated at content distributor 102 to accommodate multiple requests for the recorded television content. The allocated timeshift server 122 includes a buffer 202 (FIG. 2) that records television content, and has a timeshift duration that designates a duration of recorded television content and how far back in time a viewer can request or rewind the recorded television content. The timeshift duration of the buffer can include several hours and/or days of recorded television content that a viewer at a television client device can rewind to view the past television programming.

At block 310, the television content from the live content server is written forward in the timeshift duration of the buffer. For example, when the timeshift server 122 is newly allocated at a particular allocation time 204 (e.g., a "now" indication), the television content 104 from the live content server 114 is written forward in the timeshift duration of the buffer 202 (e.g., section 206 of buffer 202 is written forward from the allocation time 204 with the live television content 104). The adaptive timeshift service 120 at content distributor 102 coordinates writing the television content 104 from the live content server 114 to the buffer 202 of the allocated timeshift server 122.

At block 312, the recorded television content from the timeshift server is written backward in the timeshift duration of the buffer. For example, when the timeshift server 122 is newly allocated, the recorded television content 118 from one or more of the timeshift servers 116 is written backward in the timeshift duration of the buffer 202 (e.g., section 208 of buffer 202 is written backward from the allocation time 204 with the recorded television content 118). The adaptive timeshift service 120 at content distributor 102 also coordinates writing the recorded television content 118 from the timeshift servers 116 to the buffer 202 of the allocated timeshift server 122. The adaptive timeshift service 120 can also coordinate writing the recorded television content 118 from multiple timeshift servers 116 to the buffer 202 of the allocated timeshift server 122.

At block 314, a determination is made as to whether the buffer in the additional timeshift server is filled to encompass the timeshift duration. If the buffer in the additional timeshift server is not full (i.e., "no" from block 314), then the method continues at block 310 to continue writing the live television content 104 to the buffer 202, and continues at block 312 to continue writing the recorded television content 118 to the buffer 202 of the allocated timeshift server 122.

If the buffer in the additional timeshift server is full (i.e., "yes" from block 314), then at block 316, only the television content from the live content server is written forward in the timeshift duration of the buffer. For example, the television content 104 from the live content server 114 is written forward in the buffer 202 and the recorded television content 118 from the timeshift servers 116 is written backward in the buffer 202 until the buffer is filled. Once the buffer 202 has been filled, then only the television content 104 from the live content server 114 need be written forward in the buffer 202 to write over the recorded television content that is earliest in the timeshift duration (e.g., the oldest television content that has been recorded in the buffer of the allocated timeshift server 122).

Figure 4:
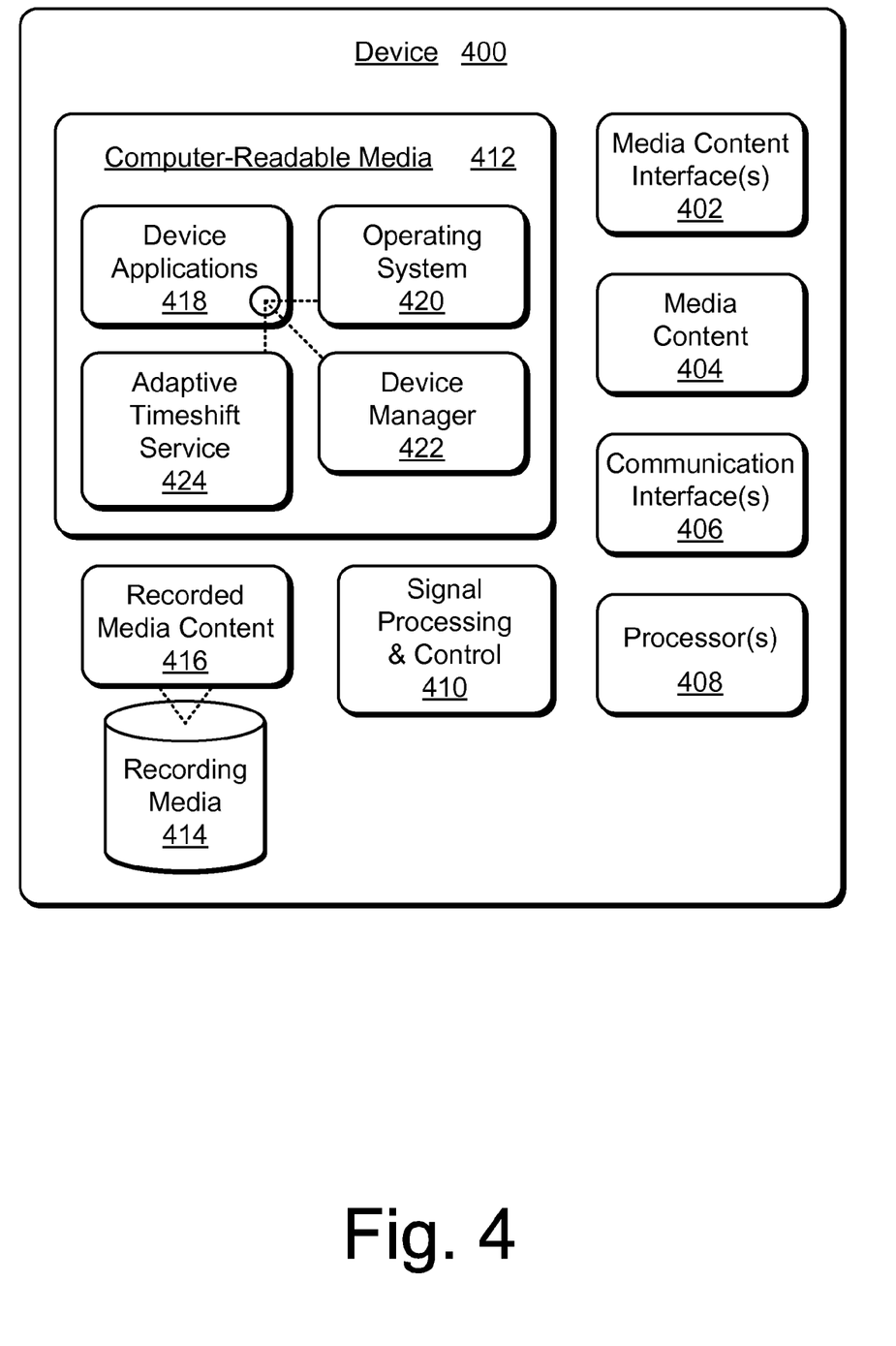
FIG. 4 illustrates various components of an example device which can implement embodiments of an adaptive timeshift service.

FIG. 4 illustrates various components of an example device 400 that can be implemented as any form of a computer, electronic, appliance, and/or media device to implement various embodiments of an adaptive timeshift service. For example, device 400 can be implemented as a content distributor, a live content server, and/or a timeshift server shown in FIG. 1 and/or FIG. 2. Device 400 can include one or more media content interfaces 402 via which any type of audio, video, and/or image media content 404 (e.g., television content) can be received from a media content source and/or distributed to media devices. The media content interfaces 402 can include Internet Protocol (IP) inputs over which streams of media content are received and/or distributed via an IP-based network.

Device 400 further includes one or more communication interfaces 406 that can be implemented as any one or more of a serial and/or parallel interface, a wireless interface, any type of network interface, a modem, and as any other type of communication interface. The communication interfaces 406 provide a connection and/or communication links between device 400 and communication network(s) by which other communication, electronic, and computing devices can communicate data and media content with device 400.

Device 400 can include one or more processors 408 (e.g., any of microprocessors, controllers, and the like) which process various computer-executable instructions to control the operation of device 400 and to implement embodiments of an adaptive timeshift service. Alternatively or in addition, device 400 can be implemented with any one or combination of hardware, firmware, or fixed logic circuitry that is implemented in connection with signal processing and control circuits which are generally identified at 410.

Device 400 can also include computer-readable media 412, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 400 may also include a recording media 414 to maintain recorded media content 416 that device 400 receives and/or records (e.g., recorded television content, recorded on-demand media content, or assets).

Computer-readable media 412 provides data storage mechanisms to store media content 404, as well as various device applications 418 and any other types of information and/or data related to operational aspects of device 400. For example, an operating system 420, a device manager 422, and an adaptive timeshift service 424 can each be maintained as a computer application and/or software module with the computer-readable media 412 and executed on the processors 408 to implement various embodiments of an adaptive timeshift service.

Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Figure 5:
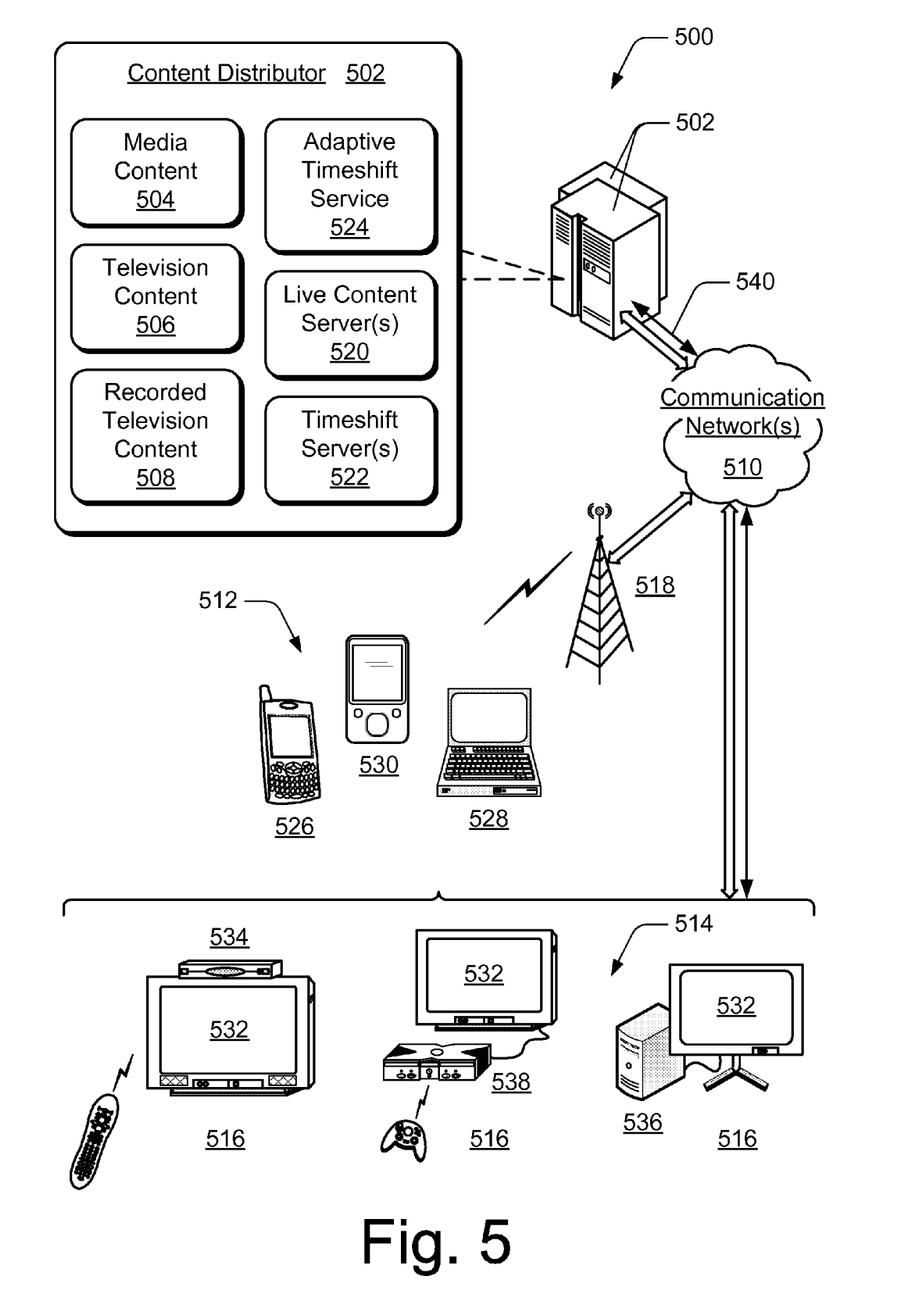
FIG. 5 illustrates an example media content distribution system in which embodiments of an adaptive timeshift service can be implemented.

FIG. 5 illustrates an example media content distribution system 500 in which various embodiments of an adaptive timeshift service can be implemented. System 500 includes one or more content distributors 502 that communicate, distribute, or otherwise provide media content 504, live television content 506, and/or recorded television content 508 to any number of various media devices via communication network(s) 510. The various media devices can include wireless media devices 512 as well as other client devices 514 (e.g., wired and/or wireless devices) that are implemented as components in various client systems 516 in the media content distribution system. Any of the various media devices can receive media content, television content, recorded content, program guide data, advertising content, closed captions data, content metadata, and any other audio, video, and/or image content from content server(s) of a content distributor 502.

Communication network(s) 510 can be implemented to include any type of a data network, voice network, broadcast network, an IP-based network, and/or a wireless network 518 that facilitates content distribution as well as data and/or voice communication between the content distributor 502, wireless media devices 512, and other client devices 514. The communication network(s) 510 can be implemented using any type of network topology and/or communication protocol, and can be represented or otherwise implemented as a combination of two or more networks. Any one or more of the arrowed communication links facilitate two-way data communication, such as from the content distributor 502 to a client system 516 and vice-versa.

The media content 504 and/or television content 506 (to included recorded media content and recorded television content) can include any type of audio, video, and/or image content received from any type of media content source, and can include television programs (or programming), advertisements, commercials, music, movies, and on-demand media content or assets. Other media content can include interactive games, network-based applications, and any other audio, video, and/or image content (e.g., to include program guide data, user interface data, search results and/or recommendations, and the like).

Content distributor 502 includes live content servers 520 that distribute the television content 506 to the various media devices as a live broadcast or multicast via the communication network(s) 510 and/or the wireless network 518. The content distributor 502 also includes timeshift servers 522 that record the television content 506 as it is being distributed by the live content servers 520. In a Network Digital Video Recording (nDVR) implementation, recorded on-demand assets can be recorded when initially distributed to the various media devices as scheduled television media content.

Content distributor 502 also includes an adaptive timeshift service 524 that can be implemented as computer-executable instructions and executed by processor(s) to implement the various embodiments and/or features of an adaptive timeshift service as described herein. Content distributor 502 can also be implemented with other various content distribution components to facilitate media content processing and distribution, such as a subscriber manager and a device monitor. The subscriber manager can manage subscriber data for users associated with the various media and client devices, and the device monitor can maintain client state information and monitor the various media devices and other client devices. In addition, a content distributor 502 can be implemented with any number and combination of differing components as further described with reference to the example device shown in FIG. 4.

The wireless media devices 512 can include any type of device implemented to receive and/or communicate wireless data, such as any one or combination of a mobile phone device 526 (e.g., cellular, VoIP, WiFi, etc.), a portable computer device 528, a media device 530 (e.g., a personal media player, portable media player, etc.), and/or any other wireless media device that can receive media content in any form of audio, video, and/or image data. Each of the client systems 516 include a respective client device and display device 532 that together render or playback any form of audio, video, and/or image content, media content, and/or television content.

A display device 532 can be implemented as any type of a television, high definition television (HDTV), LCD, or similar display system. A client device in a client system 516 can be implemented as any one or combination of a television client device 534 (e.g., a television set-top box, a digital video recorder (DVR), etc.), a computer device 536, a gaming system 538, an appliance device, an electronic device, and/or as any other type of client device that may be implemented to receive television content or media content in any form of audio, video, and/or image data in a media content distribution system.

Any of the wireless media devices 512 and other client devices 514 can be implemented with one or more processors, communication components, memory components, signal processing and control circuits, and a media content rendering system. A media or client device may also be associated with a user or viewer (i.e., a person) and/or an entity that operates the device such that a media or client device describes logical devices that include users, software, and/or a combination of devices.

Although embodiments of an adaptive timeshift service have been described in language specific to features and/or methods, it is to be understood that the subject of the appended claims is not necessarily limited to the specific features or methods described. Rather, the specific features and methods are disclosed as example implementations of an adaptive timeshift service.

The invention claimed is:

1. A method, comprising:
  distributing television content from a live content server to television client devices;
  recording the television content at a timeshift server when said distributing the television content from the live content server;
  distributing recorded television content from the timeshift server when requested by a television client device; and
  writing both the television content from the live content server and the recorded television content from the timeshift server to a buffer of an additional timeshift server, wherein the buffer of the additional timeshift server has a timeshift duration, and wherein said writing to the buffer of the additional timeshift server includes writing the television content from the live content server forward in the timeshift duration and writing the recorded television content from the timeshift server backward in the timeshift duration.

2. A method as recited in claim 1, further comprising:
  allocating the additional timeshift server; and
  coordinating said writing both the television content from the live content server and the recorded television content from the timeshift server to the buffer of the additional timeshift server.

3. A method as recited in claim 1, wherein writing the recorded television content includes writing the recorded television content from multiple timeshift servers to the buffer of the additional timeshift server.

4. A method as recited in claim 1, wherein said writing to the buffer of the additional timeshift server includes writing the television content forward in the timeshift duration and writing the recorded television content backward in the timeshift duration until the buffer is filled to encompass the timeshift duration.

5. A method as recited in claim 4, further comprising writing only the television content from the live content server forward in the buffer when the buffer is filled to write over the recorded television content that is earliest in the timeshift duration.

6. A content distributor, comprising:
  a live content server configured to distribute television content to television client devices;
  a timeshift server configured to record the television content as it is being distributed, the timeshift server further configured to distribute recorded television content when requested by a television client device; and
  an additional timeshift server that includes a buffer configured to record both the television content from the live content server and the recorded television content from the timeshift server, wherein the buffer of the additional timeshift server has a timeshift duration, and wherein the buffer is further configured to record the television content from the live content server forward in the timeshift duration and record the recorded television content from the timeshift server backward in the timeshift duration.

7. A content distributor as recited in claim 6, further comprising multiple timeshift servers configured to record the television content as it is being distributed, and wherein the buffer of the additional timeshift server is further configured to record the recorded television content from the multiple timeshift servers.

8. A content distributor as recited in claim 6, further comprising an adaptive timeshift service configured to allocate the additional timeshift server and coordinate writing the television content from the live content server and the recorded television content from the timeshift server to the buffer of the additional timeshift server.

9. A content distributor as recited in claim 8, further comprising multiple timeshift servers configured to record the television content as it is being distributed, and wherein the adaptive timeshift service is further configured to coordinate writing the recorded television content from the multiple timeshift servers to the buffer of the additional timeshift server.

10. A content distributor as recited in claim 8, wherein the adaptive timeshift service is further configured to coordinate writing the television content from the live content server forward in the timeshift duration and the recorded television content from the timeshift server backward in the timeshift duration.

11. A content distributor as recited in claim 10, wherein the adaptive timeshift service is further configured to coordinate writing the television content forward in the timeshift duration and the recorded television content backward in the timeshift duration until the buffer is filled to encompass the timeshift duration.

12. A content distributor as recited in claim 11, wherein the buffer is a circular buffer, and wherein the adaptive timeshift service is further configured to coordinate writing only the television content from the live content server forward in the buffer when the buffer is filled to write over the recorded television content that is earliest in the timeshift duration.

13. One or more computer-readable storage media comprising computer-executable instructions that, when executed, direct an adaptive timeshift service to coordinate writing both television content from a live content server and recorded television content from a timeshift server to a buffer of an additional timeshift server, the live content server distributing the television content to television client devices, and the timeshift server and the additional timeshift server each recording the television content when it is distributed, wherein the adaptive timeshift service is configured to coordinate writing the television content from the live content server forward in a timeshift duration of the buffer, and coordinate writing the recorded television content from the timeshift server backward in the timeshift duration of the buffer.

14. One or more computer-readable storage media as recited in claim 13, further comprising computer-executable instructions that, when executed, direct the adaptive timeshift service to allocate the additional timeshift server to accommodate multiple requests for the recorded television content.

15. One or more computer-readable storage media as recited in claim 13, further comprising computer-executable instructions that, when executed, direct the adaptive timeshift service to coordinate writing the television content forward in the time shift duration and the recorded television content backward in the timeshift duration until the buffer is filled to encompass the timeshift duration.

16. One or more computer-readable storage media as recited in claim 15, further comprising computer-executable instructions that, when executed, direct the adaptive timeshift service to coordinate writing only the television content from the live content server forward in the buffer when the buffer is filled to write over the recorded television content that is earliest in the timeshift duration.

* * * * *